(12) United States Patent  (10) Patent No.: US 9,129,658 B1
Yamamoto  (45) Date of Patent: Sep. 8, 2015

(54) MAGNETIC DISK DRIVE AND METHOD FOR CONTROLLING DATA REWRITE

(71) Applicant: KABUSHIKI KAISHA TOSHIBA, Tokyo (JP)

(72) Inventor: Michio Yamamoto, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/336,241

(22) Filed: Jul. 21, 2014

Related U.S. Application Data (60) Provisional application No. 61/989,677, filed on May 7, 2014.

(51) Int. Cl.
| | |
|---|---|
| G11B 19/04 | (2006.01) |
| G11B 27/36 | (2006.01) |
| G11B 5/09 | (2006.01) |
| G11B 5/012 | (2006.01) |
| G11B 20/12 | (2006.01) |
| G11B 20/18 | (2006.01) |

(52) U.S. Cl.
CPC ............ *G11B 27/36* (2013.01); *G11B 5/012* (2013.01); *G11B 20/1258* (2013.01); *G11B 2020/1823* (2013.01)

(58) Field of Classification Search
None
See application file for complete search history.

(56) References Cited

U.S. PATENT DOCUMENTS

| 7,177,979 B2 | 2/2007 | Kuwamura | |
|---|---|---|---|
| 7,215,497 B2 | 5/2007 | Urata | |
| 7,345,837 B1* | 3/2008 | Schreck et al. | 360/31 |
| 7,463,441 B2 | 12/2008 | Cho et al. | |
| 7,920,352 B2* | 4/2011 | Inoue et al. | 360/60 |
| 8,068,299 B2* | 11/2011 | Tsunokawa et al. | 360/39 |
| 8,531,793 B2* | 9/2013 | Bandic et al. | 360/54 |

* cited by examiner

*Primary Examiner* — Andrew L Sniezek
(74) *Attorney, Agent, or Firm* — Knobbe, Martens, Olson & Bear LLP (57) ABSTRACT

According to one embodiment, a controller in a magnetic disk drive manages the influence, on a first track on a disk, of data writes to tracks within outer and inner adjacent track ranges, using first and second counters associated with the first track. The first and second counters are indicative of the numbers of data writes to tracks within the outer and inner adjacent track ranges, respectively. Based on the values of the first and second counters, the controller reads data from the first track, and rewrites the read data to the first track.

12 Claims, 8 Drawing Sheets

| No. | Write address information ||||  Control flags ||
| --- | --- | --- | --- | --- | --- | --- |
|   | Cylinder | Head | Sector | Blocks | −1 | +1 |
| 1 | 0 | 0 | 0 | 0 | 0 | 0 |
| 2 | 10 | 0 | 100 | 100 | 0 | 0 |
| 3 | 12 | 0 | 150 | 10 | 0 | 0 |
| 4 | 11 | 0 | 200 | 50 | 0 | 0 |
| 5 | 100 | 0 | 100 | 100 | 0 | 0 |
| 6 | 102 | 0 | 200 | 50 | 0 | 0 |
| 7 | 101 | 0 | 150 | 10 | 0 | 0 |
| 8 | 500 | 0 | 100 | 100 | 0 | 0 |
| 9 | 501 | 1 | 100 | 100 | 0 | 0 |
| ⋮ | ⋮ | ⋮ | ⋮ | ⋮ | ⋮ | ⋮ |

| No. | Cylinder | Head | −CTR | +CTR |
|---|---|---|---|---|
| 1 | 0 | 0 | 0 | 0 |
| 2 | 1 | 0 | 0 | 0 |
| 3 | 2 | 0 | 0 | 0 |
| ⋮ | ⋮ | ⋮ | ⋮ | ⋮ |
| n | n | 0 | 0 | 0 |
| n+1 | 0 | 1 | 0 | 0 |
| n+2 | 1 | 1 | 0 | 0 |
| n+3 | 2 | 1 | 0 | 0 |
| ⋮ | ⋮ | ⋮ | ⋮ | ⋮ |

| No. | Cylinder | Head | WT_CTR |
|---|---|---|---|
| 1 | 0 | 0 | 0 |
| 2 | 1 | 0 | 0 |
| 3 | 2 | 0 | 0 |
| ⋮ | ⋮ | ⋮ | ⋮ |
| n | n | 0 | 0 |
| n+1 | 0 | 1 | 0 |
| n+2 | 1 | 1 | 0 |
| n+3 | 2 | 1 | 0 |
| ⋮ | ⋮ | ⋮ | ⋮ |

Rewrite threshold information

| WCB rewrite threshold | 10000 |
|---|---|
| BSWMB rewrite threshold | 100 |

252

WCU coefficient information

| Temperature level | Low temperature | Normal temperature | High temperature |
|---|---|---|---|
| Temperature coefficient | 1.0 | 1.0 | 1.3 |

| Zone | Outside | Center | Inside |
|---|---|---|---|
| Zone coefficient | 1.1 | 1.0 | 1.2 |

| OT write retry | None | Any |
|---|---|---|
| Write retry coefficient | 1.0 | 1.5 |

253

OT write slice information

| Positional relationship between write position and BSWM track | Non-adjacency | Adjacency |
|---|---|---|
| OT write slice value | 10% | 6% |

MAGNETIC DISK DRIVE AND METHOD FOR CONTROLLING DATA REWRITE

CROSS-REFERENCE TO RELATED APPLICATIONS

This application claims the benefit of U.S. Provisional Application No. 61/989,677, filed May 7, 2014, the entire contents of which are incorporated herein by reference.

FIELD

Embodiments described herein relate generally to a magnetic disk drive and a method for controlling a data rewrite.

BACKGROUND

In recent years, in accordance with increases in the memory capacity of magnetic disk drives, track density has been increasing. The increase in track density narrows width of tracks (i.e., the track pitch) on a disk (magnetic disk).

Where the track pitch is narrowed, data already written to tracks adjacent to a target track may be magnetically degraded in accordance with writing data to the target track with a head (magnetic head). This is caused by a component, called leakage magnetic field, which is included in a magnetic field generated by the head and makes no contribution to data written to the target track.

The influence of the leakage magnetic field on a certain track (hereinafter referred to as "track T") is accumulated whenever a data write is performed on tracks adjacent to track T. Accordingly, as the number of data writes to the adjacent tracks increases, the magnetization of track T decreases (i.e., demagnetization occurs). This phenomenon is called adjacent track interference (ATI).

As the demagnetization of track T advances due to ATI, the error rate in reading data from track T increases. Before long, even if an attempt is made to recover the data in track T by making full use of an error correction code (ECC), the data recovery will be difficult. As a result, the data will be lost. The number of data writes to adjacent tracks before the data in track T is lost varies in accordance with the write access pattern.

In recent magnetic disk drives, rewriting to restore the magnetization of track T (track refreshing) before track T becomes unreadable as a result of ATI has become essential. Such track refreshing restores the magnetization of track T.

DETAILED DESCRIPTION

Various embodiments will be described hereinafter with reference to the accompanying drawings.

In general, according to one embodiment, a magnetic disk drive comprises a disk, a head and a controller. The disk comprises a plurality of tracks including a first track. The head is configured to write data to the disk, and to read data from the disk. The controller is configured to control a data write to the disk by the head, and a data read from the disk by the head. The controller is further configured to manage influence, on the first track, of data writes to a track within an outer adjacent track range, and data writes to a track within an inner adjacent track range, using a first counter and a second counter associated with the first track. The outer adjacent track range is adjacent to the first track outside the first track and comprises at least one track. The inner adjacent track range is adjacent to the first track inside the first track and comprises at least one track. The first counter is configured to indicate number of data writes to the track within the outer adjacent track range, and the second counter is configured to indicate number of data writes to the track within the inner adjacent track range. The controller is also configured to read data from the first track, and to rewrite the read data to the first track, based on values of the first and second counters.

Figure 1:
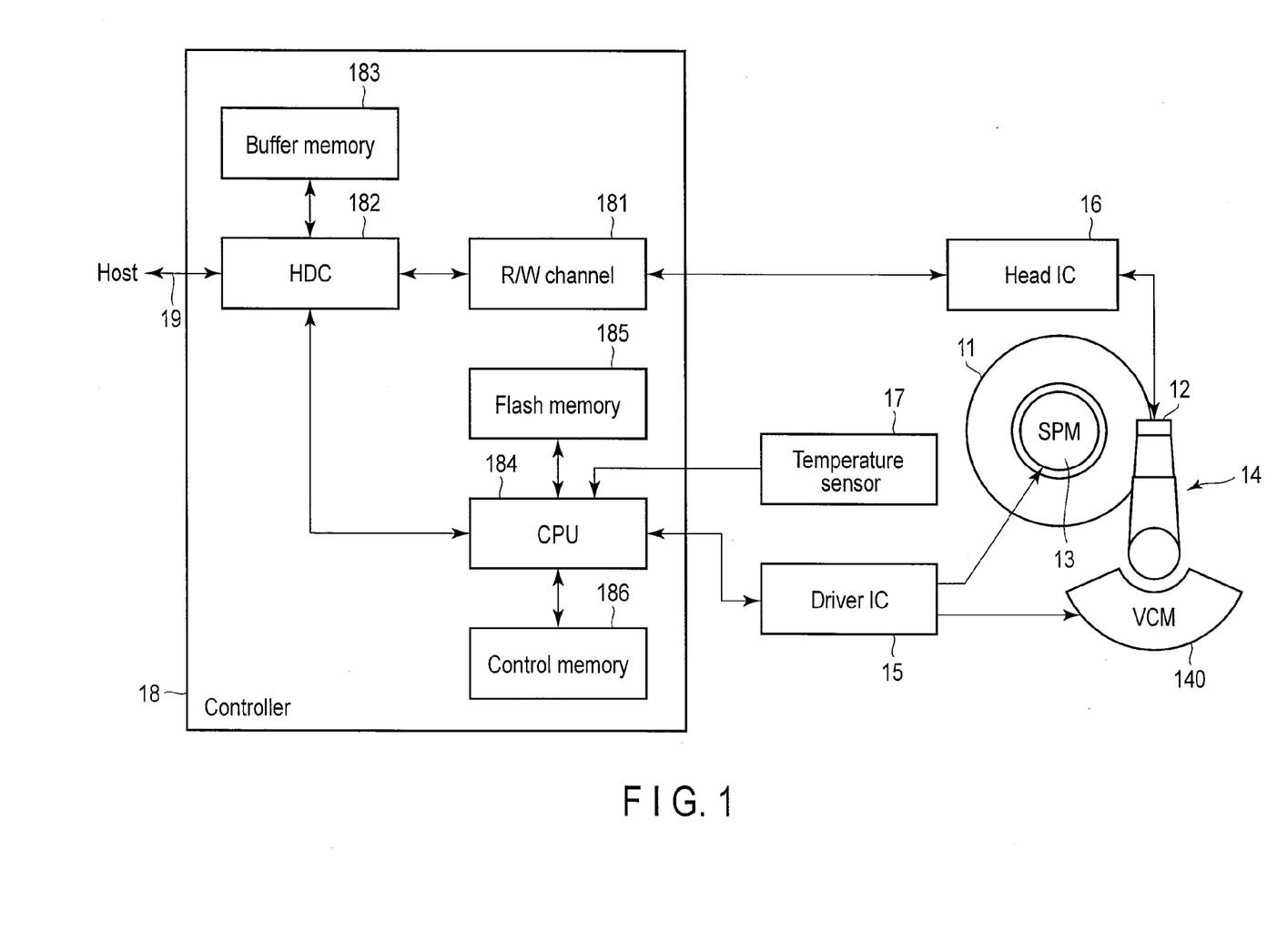
FIG. 1 is a block diagram showing an exemplary configuration of a magnetic disk drive according to an embodiment.

FIG. 1 is a block diagram showing an exemplary configuration of a magnetic disk drive according to an embodiment. The magnetic disk drive shown in FIG. 1 is also called a hard disk drive (HDD), and includes a disk (magnetic disk) 11, a head (magnetic head) 12, a spindle motor (SPM) 13, an actuator 14, a driver IC 15, a head IC 16, a temperature sensor 17 and a controller 18.

The disk 11 is a magnetic recording medium having opposite recording surfaces on which data is magnetically recorded. The disk 11 is spun at high speed by the SPM 13. The SPM 13 is driven by a driving current (or driving voltage) applied by the driver IC 15.

The disk 11 (more specifically, each recording surface of the disk 11) has, for example, a plurality of concentric tracks and a plurality of servo areas. The servo areas are arranged radially in a radial direction of the disk 11 and discretely at regular intervals in a circumferential direction of the disk 11. The area between each pair of adjacent servo areas in each track is used as a data area. In each track, the area formed of a respective servo area and a data area adjacent to the respective servo area is called a servo sector. The data area includes a plurality of data sectors.

Servo data is stored in each of the servo areas. The servo data includes a servo mark, address data and servo burst data. The servo mark is formed of a particular code (pattern signal) used for identifying the corresponding servo sector. The address data is formed of an address (i.e., a cylinder address) assigned to the corresponding track, and an address (i.e., a servo sector address) assigned to the corresponding servo sector. The servo burst data is formed of data (so called relative position data) used to detect a displacement (position error) of the head 12 from, for example, the center line of the corresponding track.

The head 12 is disposed in association with one of the opposite recording surfaces of the disk 11. FIG. 1 does not show the other head disposed in association with the other recording surface of the disk 11, for facilitating the drawing of the figure. In the description below, however, this head may also be denoted as a head 12.

The head 12 is attached to the tip of the actuator 14. When the disk 11 is spun at high speed, the head 12 floats above the disk 11. The actuator 14 has a voice coil motor (VCM) 140 as a driving source for the actuator. The VCM 140 is driven by a driving current (voltage) applied by the driver IC 15. When the actuator 14 is driven by the VCM 140, this causes the head 12 to move over the disk 11 in the radial direction of the disk 11 so as to draw an arc.

In the configuration of FIG. 1, a magnetic disk drive having a single disk is supposed. However, a plurality of disks 11 may be arranged. Further, in the configuration of FIG. 1, the disk 11 has opposite recording surfaces. However, the disk 11 may have a single recording surface and a single head 12 may be disposed in association with the single recording surface.

The driver IC 15 drives the SPM 13 and the VCM 140 under the control of the controller 18 (more specifically, a CPU 184 in the controller 18). The head IC 16 includes a head amplifier which amplifies the signal (read signal) read by the head 12 (more specifically, the read element of the head 12). The head IC 16 also includes a write driver. The write driver converts the write data transmitted from the controller 18 (more specifically, an R/W channel 181 in the controller 18) into a write current. The write driver transmits the write current to the head 12 (more specifically, the write element of the head 12). The temperature sensor 17 detects the temperature (ambient temperature) of the magnetic disk drive shown in FIG. 1.

The controller 18 is realized by, for example, an LSI called a system-on-chip (SOC) where a plurality of elements are integrated in a single chip. The controller 18 includes a read/write channel (R/W channel) 181, a hard disk controller (HDC) 182, a buffer memory 183, a CPU 184, a flash memory 185 and a control memory 186.

The R/W channel 181 processes signal associated with read/write. The R/W channel 181 digitizes a read signal, and decodes read data from the digitized data. The R/W channel 181 also extracts, from the digital data, servo data necessary for positioning the head 12. The R/W channel 181 further encodes write data.

The HDC 182 is connected to a host via the host interface 19. The HDC 182 receives commands (a write command, a read command, etc.) from the host. The HDC 182 controls data transfer between itself and the host. The HDC 182 also controls data transfer between itself and the R/W channel 181.

The buffer memory 183 is formed of a nonvolatile memory, such as a RAM. The buffer memory 183 is used to temporarily store the write data to be written to the disk 11 (and a write command for designating a data write to the disk 11), and the data read from the disk 11 via the head 12, the head IC 16 and the R/W channel 181.

Figure 2:
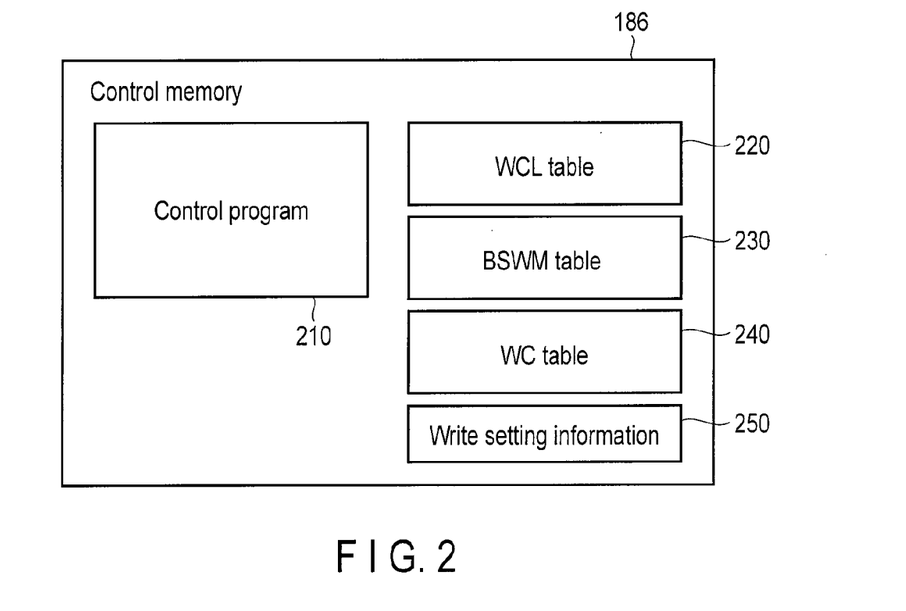
FIG. 2 is a view showing an example of information stored in the control memory shown in FIG. 1.

The CPU 184 functions as a main controller in the magnetic disk drive. The CPU 184 controls at least part of the other elements of the magnetic disk drive in accordance with a control program 210 (FIG. 2). The flash memory 185 is a rewritable nonvolatile memory, such as a NAND flash memory. The flash memory 185 pre-stores, for example, the control program 210. The control memory 186 is a volatile memory, such as a RAM.

FIG. 2 shows an example of information stored in the control memory 186. As shown in FIG. 2, the control memory 186 stores the control program 210, a write command log (WCL) table 220, a both-side write monitor (BSWM) table 230, a write counter (WC) table 240 and write setting information 250.

In the embodiment, the control program 210 is stored in the flash memory 185 as mentioned above, and is loaded from the flash memory 185 to the control memory 186 upon activation of the magnetic disk drive shown in FIG. 1. The WCL table 220, the BSWM table 230, the WC table 240 and the write setting information 250 are stored in the system are of the disk 11, and are loaded from the system area to the control memory 186 upon activation of the magnetic disk drive. The system area is used to store the information used by the system (e.g., the controller 18) for management. The disk 11 has a user area, as well as the system area. The user area is a memory area that can be used by a user.

Figure 3:
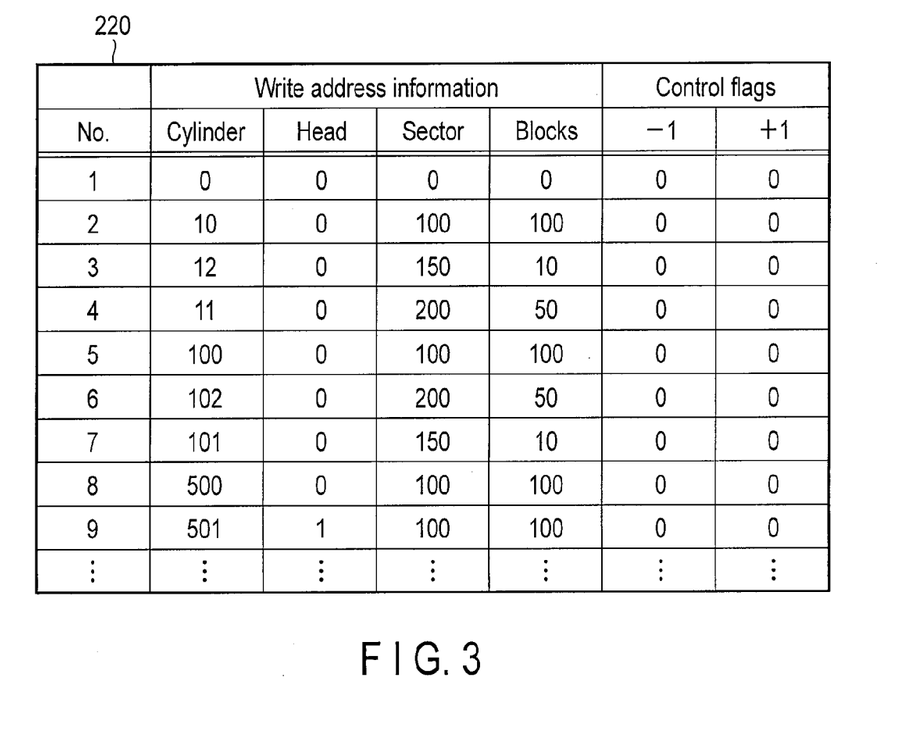
FIG. 3 shows a data structure example of the write command log table shown in FIG. 2.

FIG. 3 shows a data structure example of the WCL table 220 shown in FIG. 2. Each entry of the WCL table 220 is used to store a write command log (WCL). The WCL (log information) includes write address information and control flag information.

The write address information includes a physical address and data indicative of the number of blocks (hereinafter referred to as "the block-number data"). The physical address is obtained by subjecting, to address translation, a logical address (i.e., a start logical address) indicative of the write destination (leading write destination) designated by a write command. The physical address is indicative of a physical position on the disk 11, and is formed of a cylinder number (i.e., the cylinder address), a head number, and a sector number (data sector number). In general, a logical block address is used as the logical address.

The block-number data is indicative of the size (the number of blocks in this case) of the write data designated by the write command. In the embodiment, the size of one block is identical to that of one sector (data sector), and hence the number of blocks is identical to that of the sectors.

The control flag information includes a "−1" flag (first flag) and a "+1" flag (second flag). The −1 flag and the +1 flag are indicative of whether a data write to the corresponding track is already reflected in the entries of the BSWM table 230 associated with an adjacent track (i.e., an outer adjacent track) just outside the corresponding track, and an adjacent track (i.e., an inner adjacent track) just inside the corresponding track, respectively. The corresponding track is the track indicated by the write address information associated with the control flag information.

Figure 4:
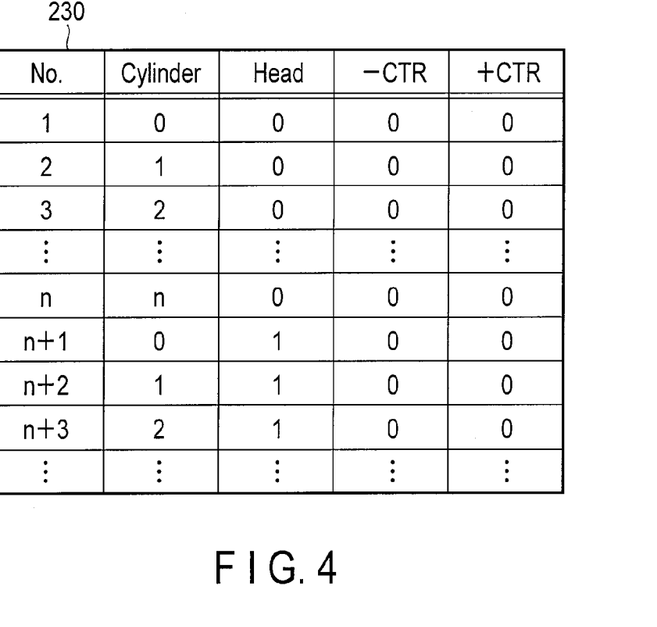
FIG. 4 shows a data structure example of the both-side write monitor table shown in FIG. 2.

FIG. 4 shows a data structure example of the BSWM table 230 shown in FIG. 2. The BSWM table 230 includes the entries associated with the tracks on the disk 11. Each of the entries of the BSWM table 230 is used to store both-side write monitor (BSWM) information. The BSWM information is indicative of a monitoring result of data writes to adjacent tracks (i.e., the outer adjacent track and the inner adjacent track) located on opposite sides of the corresponding track. The BSWM information includes a combination of a cylinder number and a head number that is indicative of the corresponding track. The BSWM information further includes a combination of a minus counter (hereinafter referred to as "the −CTR") and a plus counter (hereinafter referred to as "the +CTR"). The −CTR (first counter) and the +CTR (second counter) are software counters used to indicate the number of data writes to an outer adjacent track adjacent to the corresponding track, and that of data writes to an inner adjacent track adjacent to the corresponding track, respectively.

Figure 5:
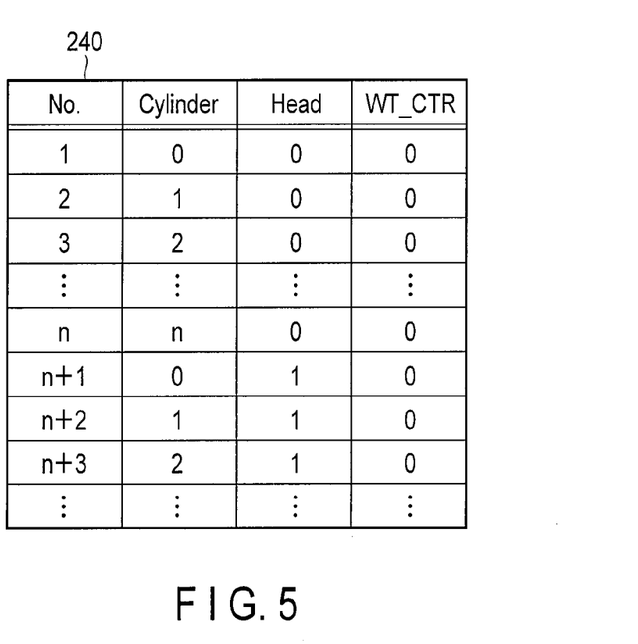
FIG. 5 shows a data structure example of the write counter table shown in FIG. 2.

FIG. 5 shows a data structure example of the WC table 240 shown in FIG. 2. The WC table 240 has entries associated with the respective tracks on the disk 11. Each of the entries of the WC table 240 is used to store write counter (WC) information. The WC information includes the combination of the cylinder number and the head number that is indicative of the corresponding track, and a write counter (hereinafter referred to as "the WT_CTR"). The WT_CTR (third counter) is a software counter used to indicate the number of data writes to the tracks adjacent to the corresponding track.

The numbers of data writes indicated by the –CTR, +CTR and WT_CTR are weighted (normalized) numbers, and are not indicative of the actual number of data writes. The weighing process will be described later.

Figure 6:
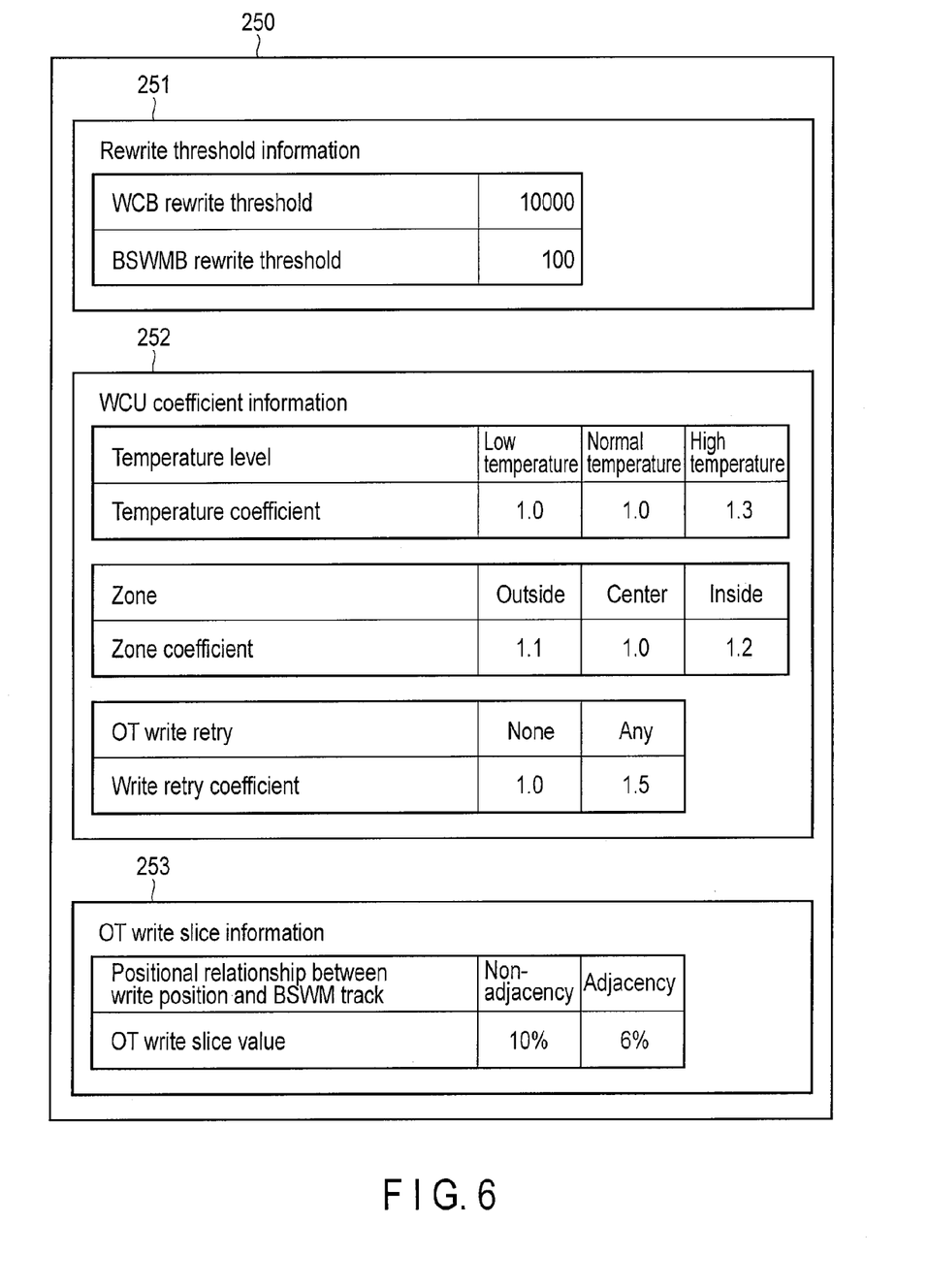
FIG. 6 shows a data structure example of the write setting information shown in FIG. 2.

FIG. 6 shows a data structure example of the write setting information 250 shown in FIG. 2. The write setting information 250 includes rewrite threshold information 251, write counter update (WCU) coefficient information 252 and off-track (OT) write slice information 253.

The rewrite threshold information 251 includes a threshold (hereinafter referred to as "the WCB rewrite threshold") for rewiring (WBC rewriting) based on the write counter, and a rewrite threshold (hereinafter referred to as "the BSWMB rewrite threshold") for rewriting (BSWMB rewriting) based on both-side write monitoring. The WCB rewrite threshold is indicative of a threshold used for activating (executing) a data rewrite to the corresponding track based on the WT_CTR in the WC table 240. The BSWMB rewrite threshold is indicative of a threshold used for activating a data rewrite to the corresponding track based on the combination of the –CTR and +CTR in the BSWM table 230.

The WCU coefficient information 252 includes, for example, three temperature coefficients (first coefficients), three zone coefficients (second coefficients) and two write retry coefficients (third coefficients). The temperature coefficient, zone coefficient and write retry coefficient selected from those coefficients are used as weights for determining the respective values to be added to the WT_CTR, –CTR and +CTR.

The three temperature coefficients are associated with three temperature levels (temperature ranges), such as a low temperature, a normal temperature and a high temperature. One of the three temperature coefficients is selected based on whether the ambient temperature of the magnetic disk drive (the corresponding ambient temperature) detected by the temperature sensor 17 is low, normal or high when data is written to a target track. Each of the three temperature coefficients is indicative of the strength ratio of influence of the corresponding ambient temperature on ATI. In the example of FIG. 6, the temperature coefficient selected (applied) when the temperature level is low and normal is a reference temperature coefficient, i.e., 1.0. In contrast, the temperature coefficient selected when the temperature level is high is, for example, 1.3, namely, 1.3 times the reference coefficient. Thus, the temperature coefficient of 1.3 is determined considering that when the temperature level is high, the influence of ATI upon adjacent tracks increases by 30%, compared to the case where the temperature level is low or normal.

The three zone coefficients are associated with three radial ranges (zones) on the disk 11, which are, for example, the outer, central and inner zones. When data is written to a target track, one of the three zone coefficients is selected based on whether the target track is in the outer, central or inner zone (namely, based on the radial position of the target track on the disk 11). In the example of FIG. 6, the zone coefficient selected when the target track is in the central zone on the disk 11 is a reference zone coefficient of 1.0. In contrast, the zone coefficient selected when the target track is in the outer (inner) zone on the disk 11 is 1.1 (1.2), which is 1.1 (1.2) times the reference zone coefficient. The difference in the influence of the radial position of the target track on the disk 11 upon ATI is based on the difference in the angle (skew angle) between the head 12 and the target track (more specifically, the tangent line of the radial position of the target track on the disk 11 with respect to the circumference of the disk).

The two write retry coefficients are associated with whether a data write to the target track is an off-track (OT) write retry. The OT write retry means a retry (write retry) executed when data is written to the target track in the OT state. The OT state means a state in which the head 12 is deviated, for example, from the center line of the target track by an amount exceeding a reference amount (or a reference ratio). One of the two write retry coefficients is selected based on whether a data write to the target track, if any, is the OT write retry. In the example of FIG. 6, the write retry coefficient selected when the data write is not the OT write retry is a reference write retry coefficient of 1.0. In contrast, the write retry coefficient selected when the data write is the OT write retry is 1.5, which is 1.5 times the reference write retry coefficient.

The specific temperature ranges, such as low-, normal- and high-temperature ranges, associated with the temperature coefficient, and the number of the temperature coefficients (temperature ranges), may be set in accordance with, for example, the type or characteristics of the magnetic disk drive shown in FIG. 1, and also in accordance with the required precision of the influence of ATI. The same can be said of the zone coefficients and the write retry coefficients. For instance, a plurality of write retry coefficients may be set in association with the number of times of the OT write retry.

The OT write slice information 253 includes, for example, two OT write slice values. The two OT write slice values are associated with "non-adjacency" and "adjacency" that are indicative of the positional relationship between a target track (the track to which data is to be written, i.e., a write track) and a BSWM (both-side write monitor) track (more specifically, any one of the BSWM tracks registered in the BSWM table 230). The BSWM track is the one indicated by the combination of the cylinder number and the head number in the BSWM information stored in each entry of the BSWM table 230, if at least the –CTR or +CTR in the BSWM information is not zero. Each of the two OT write slice values is indicative of a displacement of the head 12 allowable when the head 12 is positioned on the target track to write data thereto. In the embodiment, each OT write slice value is indicative of, as an allowable displacement, the ratio of the allowable displacement to the track width. One of the two OT write slice values is selected when data is written to the target track, based on whether the target track is adjacent to any one of the BSWM tracks registered in the BSWM table 230. In the example of FIG. 6, the OT write slice value selected in the case of non-adjacency is 10%. In contrast, the OT write slice value selected in the case of adjacency is 6%. The OT write slice value of 6% is set, considering that when the target track is adjacent to a BSWM track, the influence of ATI upon the adjacent track (i.e., the BSWM track) due to the displacement of the head 12 is stronger than when the target track is adjacent to non-BSWM track.

Figure 7:
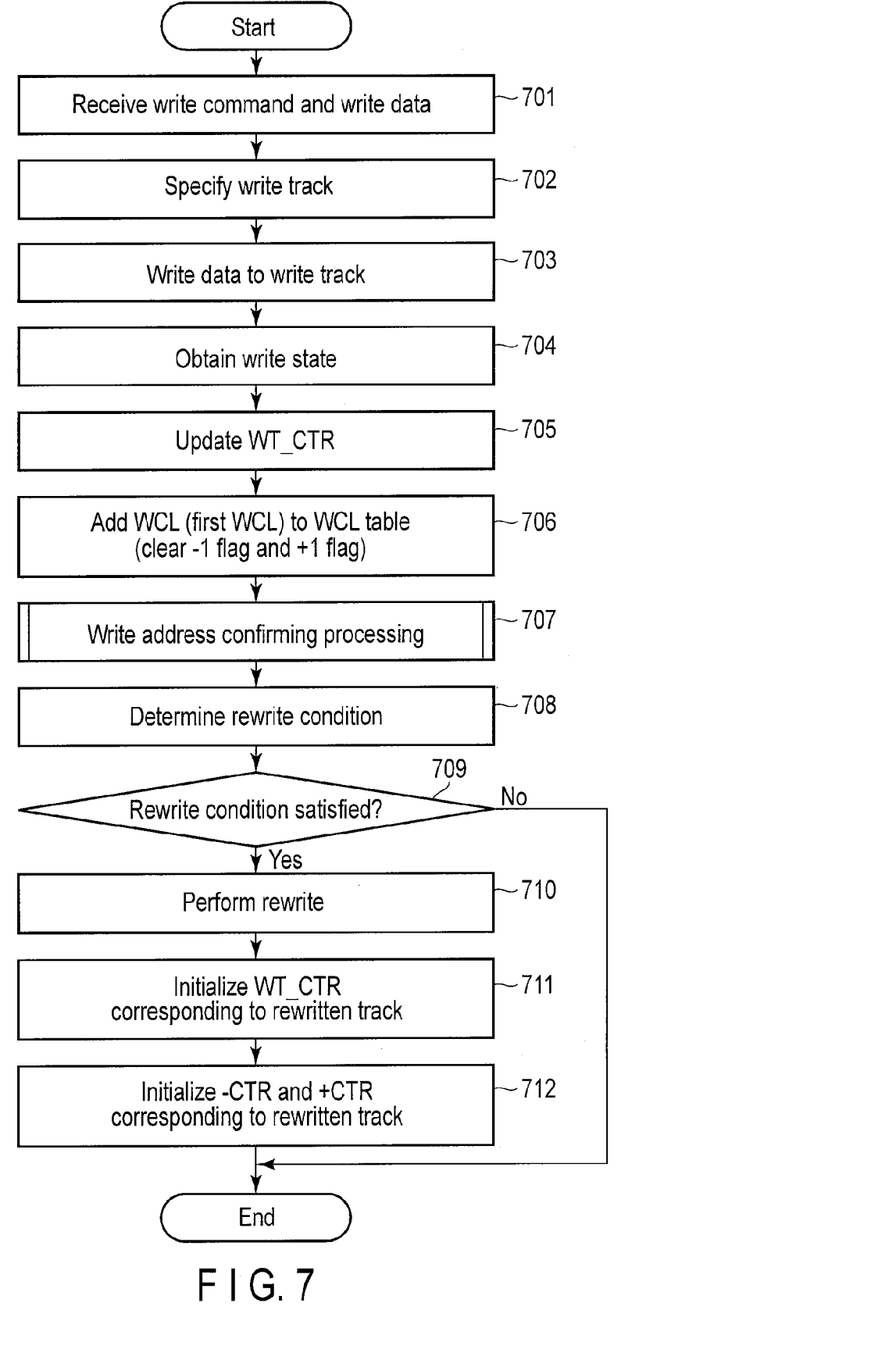
FIG. 7 is a flowchart for explaining a typical procedure for write processing in the embodiment.
Figure 8:
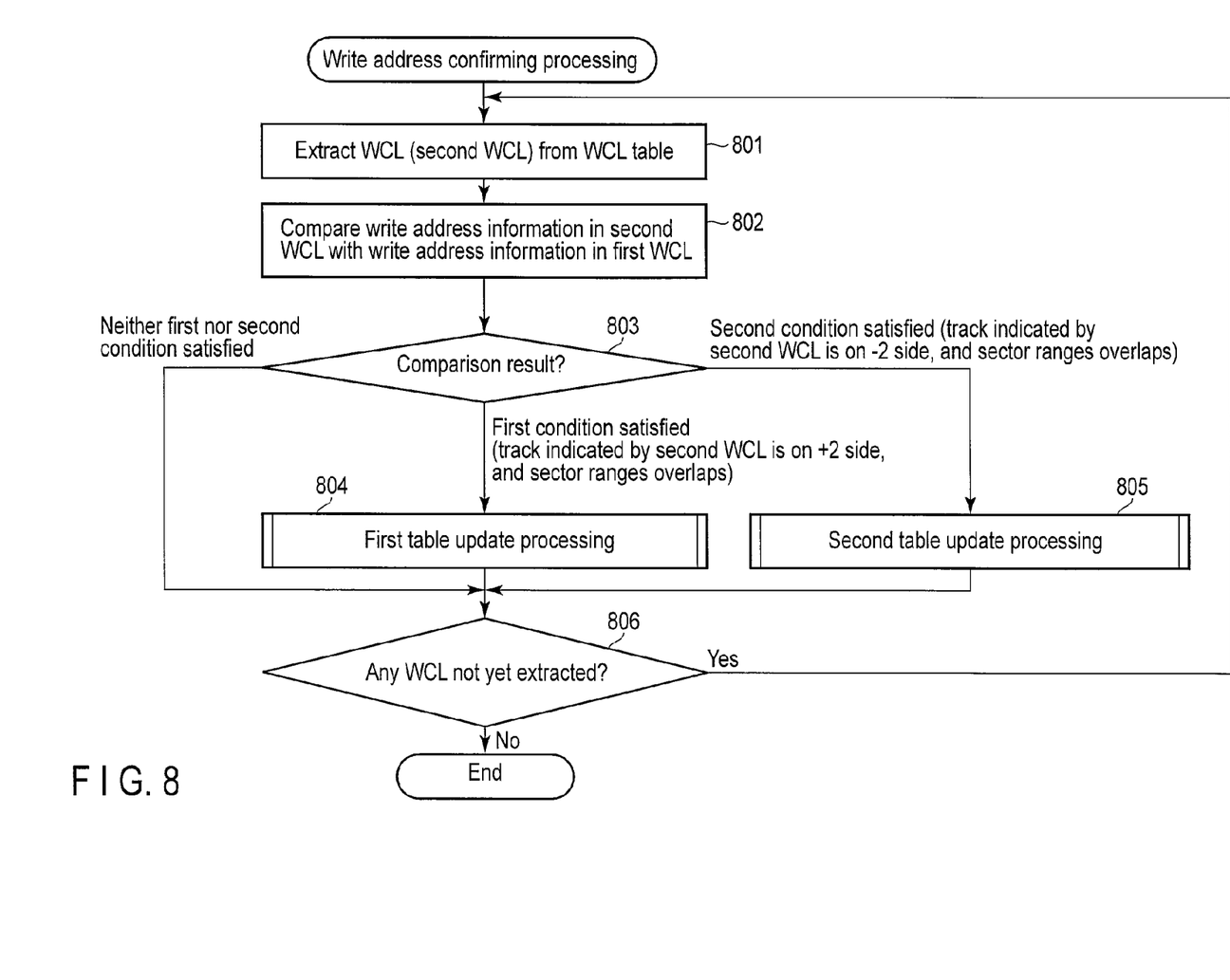
FIG. 8 is a flowchart for explaining a typical procedure for the write address confirming processing in the flowchart of FIG. 7.

Referring then to FIGS. 7 to 10, a description will be given of the operation of the embodiment, using write processing as an example. FIG. 7 is a flowchart for explaining a typical procedure for write processing in the embodiment. FIG. 8 is a flowchart for explaining a typical procedure for the write address confirming processing in the flowchart of FIG. 7.

Figure 9:
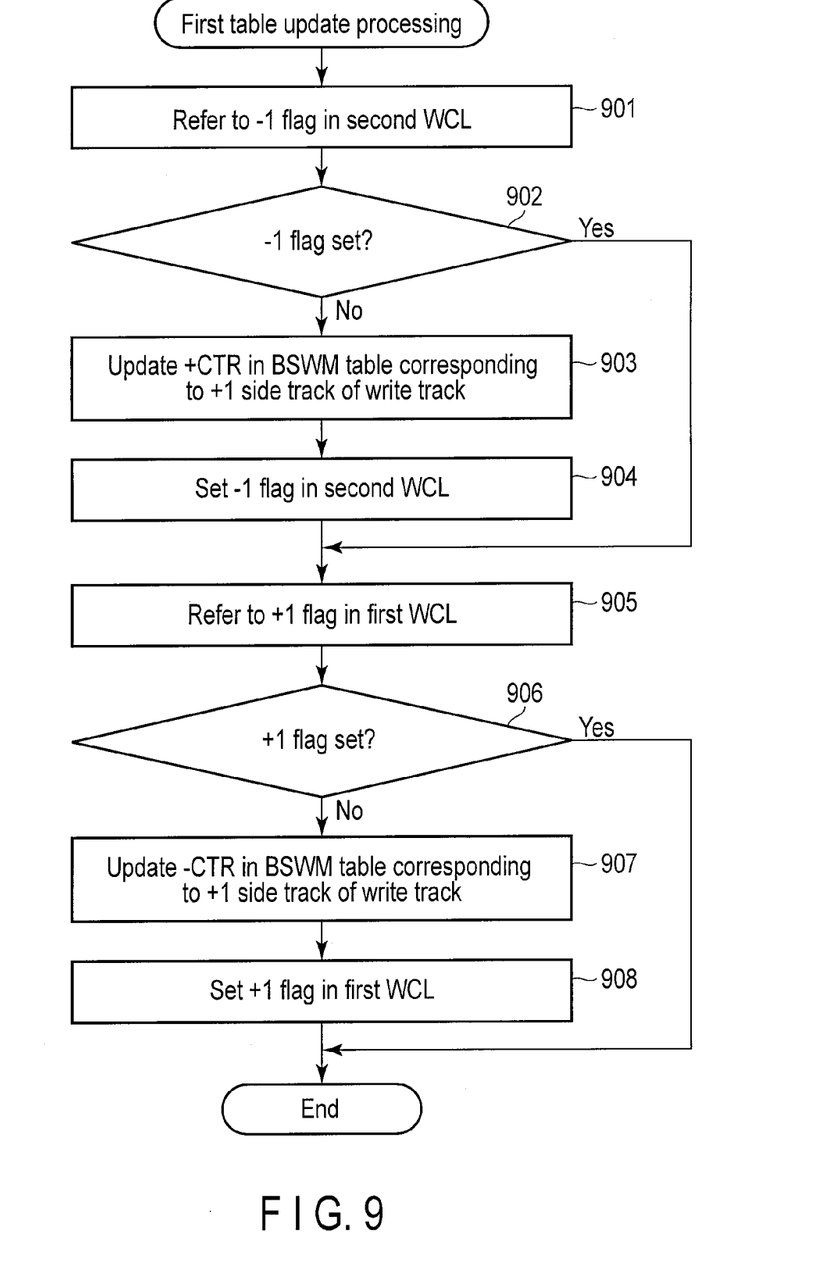
FIG. 9 is a flowchart for explaining a typical procedure for the first table updating processing in the flowchart of FIG. 8.
Figure 10:
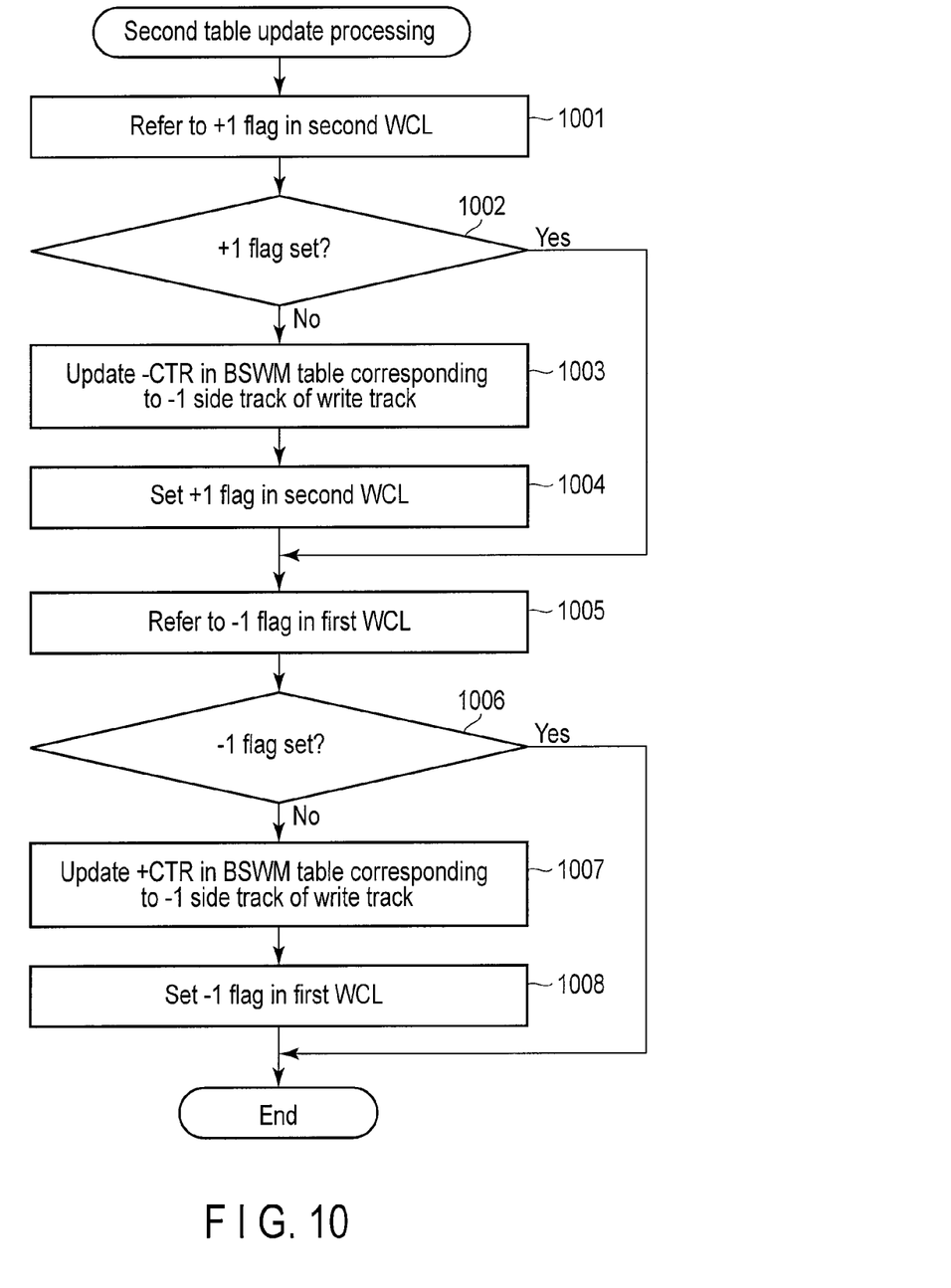
FIG. 10 is a flowchart for explaining a typical procedure for the second table updating processing in the flowchart of FIG. 8.

FIG. 9 is a flowchart for explaining a typical procedure for the first table updating processing in the flowchart of FIG. 8. FIG. 10 is a flowchart for explaining a typical procedure for the second table updating processing in the flowchart of FIG. 8. The write processing in the embodiment is classified broadly into a first case where no write access pattern strongly influenced by ATI is detected, and a second case where a write access pattern strongly influenced by ATI is detected.

The write processing in the first case will firstly be described. Assume here that a write command and write data sent from the host have been received by the HDC 182 via the host interface 19, and stored in the buffer memory 183 (block 701). Further, the write command received by the HDC 182 is transferred to the CPU 184. As is well known, the write command includes a logical address (e.g., a logical block address) indicative of the destination of writing, and block-number data indicative of the number of write blocks (the number of sectors).

Using, for example, an address translation table, the CPU 184 translates the logical block address indicative of the destination of writing into a physical address (namely, a physical address formed of a cylinder number, a head number and a sector number) indicative of a physical position on the disk 11. Based on the physical address and the number of blocks, the CPU 184 specifies the write position on the disk 11 designated by the write command from the host (more specifically, the write position indicated by the physical address and the number of blocks) (block 702). To simplify the description, it is supposed that the write position (write range) ranges over some or all sectors in one track. Therefore, in the description below, the specified write position will be referred to as "the track" or "the write track."

Subsequently, the CPU 184 causes the head 12 to write, to the track (i.e., the write track) specified on the disk 11, the write data stored in the buffer memory 183 (block 703). For this data write, the CPU 184 functions as a servo controller and controls the driver IC 15 based on servo data extracted by the R/W channel 181. By this control, the CPU 184 moves the head 12 to the write track (target track) on the disk 11 (seek operation), and then positions the head 12 at, for example, the center line of the write track (head positioning operation).

During the above head positioning, the CPU 184 refers to the BSWM table 230, thereby determining whether the write track is adjacent to any one of the BSWM tracks registered in the BSWM table 230. Namely, the CPU 184 determines whether BSWM information including write address information indicative of each track adjacent to the write track is registered in the BSWM table 230. If the write track is adjacent to any BSWM track, i.e., if a track adjacent to the write track is a BSWM track (i.e., a track registered in the BSWM table 230), the CPU 184 selects the OT write slice value (6% in the embodiment) associated with "adjacency." In contrast, if the write track is adjacent to non-BSWM tracks, the CPU 184 selects the OT write slice value (10% in the embodiment) associated with "non-adjacency."

Further, based on servo data (more specifically, servo burst data in the servo data) extracted by the R/W channel 181, the CPU 184 iteratively calculates a displacement of the head 12 from the center line of the write track at intervals corresponding to, for example, the servo sectors. If the calculated displacement exceeds the allowable range indicated by the selected OT write slice value, the CPU 184 withholds a data write to the write track. In contrast, if the calculated displacement falls within the allowable range indicated by the selected OT write slice value, the CPU 184 causes the head 12 to write data to the write track as mentioned above (block 703). However, if the displacement of the head 12 exceeds the allowable range during a data write to the write track, the CPU 184 retries a data write to the write track in block 703.

In the embodiment, when the write track is adjacent to any one of the BSWM tracks, the CPU 184 selects the OT write slice value associated with "adjacency," i.e., lower than the OT write slice value associated with "non-adjacency." If the write track is adjacent to any one of the BSWM tracks, and hence it is strongly possible that the displacement of the head 12 will accelerate the influence of ATI upon the adjacent track, the CPU 184 uses the lower OT write slice value. As a result, the factor of accelerating the influence of ATI upon the adjacent track can be eliminated.

After executing the data write to the write track (block 703), the CPU 184 obtains the state of the data write (block 704). The state of the data write includes, for example, the ambient temperature detected by the temperature sensor 17 during the data write. The state of the data write also includes the radial position (write position) of the write track on the disk 11, and the number of write retries (OT write retries).

Subsequently, based on the obtained data write state, the CPU 184 updates, as follows, WT_CTRs (hereinafter, a first WT_CTR and a second WT_CTR) in the entries of the WC table 240 associated with the opposite adjacent tracks (the outer adjacent track and the inner adjacent track) of the write track (block 705). Firstly, in order to update the first and second WT_CTRs, the CPU 184 selects, from the WCU coefficient information 252, a temperature coefficient (TC), a zone coefficient (ZC) and a write retry coefficient (WRC) corresponding to the state of the obtained data write (i.e., the ambient temperature, the write position and the number of write retries).

After that, based on the selected temperature coefficient (TC), zone coefficient (ZC) and write retry coefficient (WRC), and a write count (WC) (=the number of writes), the CPU 184 calculates the value (additional value) to be added to each of the values of the first and second WT_CTRs, using the following equation (1):

$$\text{Additional value} = WC \times TC \times ZC \times WRC \quad (1)$$

where the write count (WC) means the number of data writes in block 703, namely, the number of data writes (1+the number of write retries) including the number of write retries.

After calculating the additional value, the CPU 184 adds the calculated additional value to each of the values of the first and second WT_CTRs. As a result, each of the values of the first and second WT_CTRs is incremented by the calculated additional value.

If no write retry is performed, and if the temperature coefficient (TC), zone coefficient (ZC), and write retry coefficient (WRC) are all 1.0, each of the values of the first and second WT_CTRs is incremented by the write count (WC) as in the prior art. In contrast, if at least the temperature coefficient (TC), the zone coefficient (ZC), the write retry coefficient (WRC), or the write count (WC) is not 1.0 (more specifically, greater than 1.0), each of the values of the first and second WT_CTRs is incremented by a value greater than the write count (WC) unlike the prior art. In other words, the values of the first and second WT_CTRs are not indicative of the actual number of data writes to the write track, but are indicative of the respective numbers of data writes weighted (normalized) based on the degrees of influence, upon the opposite adjacent tracks of the write track, of ATI caused by data writes to the write track.

Whenever a data write to the write track is executed in block 703, an additional value may be calculated using the above-mentioned equation, and the thus-calculated additional value be added to each of values of the first and second WT_CTRs. Namely, when a first data write is executed in block 703, first calculation of the additional value and addition of the additional value may be executed, and if a write retry is performed after that, calculation of the additional value and addition of the additional value may be executed whenever a write retry is performed. In this case, 1 is used as the write count (WC) in the above equation.

In the embodiment, when data is written to a write track (target track), the CPU 184 updates WT_CTRs (the first WT_CTR and second WT_CTR) in the entries of the WC table 240 associated with the opposite adjacent tracks (the outer adjacent track and the inner adjacent track) of the write track. Alternatively, as described below, the CPU 184 may update WT_CTRs in the respective entries of the WC table 240 associated with tracks included in each of track ranges (i.e., an outer adjacent track range and an inner adjacent track range) adjacent to the write track on opposite sides thereof. Each of the outer adjacent track range and the inner adjacent track range includes the number (first number) of tracks exceeding 1. In contrast, the embodiment is directed to the case where each of the outer adjacent track range and the inner adjacent track range includes one track, i.e., the first number is 1.

Assuming that the write track is set as a reference position (0th position), the $i^{th}$ track (i is an integer greater than 0) in each of the outer and inner adjacent track ranges (opposite adjacent track ranges) is denoted as track i. Further, the WT_CTR in the entry of the WC table 240 associated with track i is denoted as WT_CTR (i).

The degree of influence of ATI on track i due to a data write to the write track generally depends upon i (namely, the relative position of track i in each adjacent track range), such that the greater the value of i, the smaller the influence of ATI. In view of this, a new coefficient (hereinafter, referred to as "the track position coefficient") corresponding to the value of i may be added. In this case, the CPU 184 may calculate the value (additional value) to be added to WT_CTR (i) based on the temperature coefficient (TC), the zone coefficient (ZC), the write retry coefficient (WRC), the track position coefficient (TPC), and the write count (WC), using the following equation (2):

$$\text{Additional value} = WC \times TC \times ZC \times WRC \times TPC \quad (2)$$

In this equation (2), a value of, for example, 1.0 may be used as the track position coefficient (TPC) corresponding to i=1 (the outer and inner adjacent tracks). Further, the track position coefficient (TPC) may be set such that it decreases as the value i increases.

After executing block 705, the CPU 184 proceeds to block 706. In block 706, the CPU 184 adds, to the WCL table 220, log information associated with the write command received in block 701, i.e., WCL (hereinafter referred to as "the first WCL"). The first WCL includes write address information indicative of the write position (the position of the write track) on the disk 11, and the two control flags (i.e., the −1 flag and the +1 flag). When the first WCL have been added to the WCL table 220, the −1 flag and the +1 flag in the first WCL are already cleared.

Subsequently, the CPU 184 executes write address confirming processing (block 707). The write address confirming processing means processing for confirming whether the WCLs in the WCL table 220 include a WCL (second WCL) that satisfies the following first or second condition. The first or second condition is that a write position (second write position) indicated by the WCL is two tracks either side (inside or outside) of a current write position (first write position) on the disk 11. The first or second condition also implies that a sector range (second sector range), to which a write is made, at least partially overlaps with a sector range (first sector range) of the current write position.

In the embodiment, the cylinder number increases toward the inside of the disk 11. Accordingly, in the embodiment, "+" is used as a sign indicative of the direction toward the inside of the disk 11, and "−" is used as a sign indicative of the direction toward the outside of the disk 11. Further, the position N tracks inside the write position (the first write position) is referred to as "+N," and the track in this position is referred to as "the +N side track." Similarly, the position N tracks outside the write position (the first write position) will be referred to as "−N," and the track in this position will be referred to as "the −N side track." Yet further, being N tracks inside will be referred to as "being +N tracks (away)" and being N tracks outside will be referred to as "being −N tracks (away)."

The CPU 184 executes the above-mentioned write address confirming processing (block 707) as follows, in accordance with the flowchart shown in FIG. 8: Firstly, the CPU 184 extracts, as the second WCL from the WCL table 220, one WCL (except for the first WCL) that has not yet been extracted from the WCL table 220 (block 801). Subsequently, the CPU 184 compares write address information (second write address information) in the second WCL with write address information (first write address information) in the first WCL (block 802). The second write address information (the second WCL) is indicative of the second write position (the position of a third track), and the first write address information (the first WCL) is indicative of the current write position, i.e., the first write position (the position of a second track).

Based on the comparison result, the CPU 184 determines whether the positional relationship between the second write position and the first write position satisfies the first or second condition (block 803). Namely, the CPU 184 determines whether the comparison result meets the first or second condition.

More specifically, if the third track indicated by the second WCL is on +2 side of the second track indicated by the first WCL (namely, if the third track is in the position +2 tracks from the second track), and if the sector ranges of the both write tracks at least partially overlap each other, the CPU 184 determines that the comparison result meets the first condition. Further, if the third track indicated by the second WCL is on −2 side of the second track indicated by the first WCL (namely, if the third track is in the position −2 tracks from the second track), and if the sector ranges of the both write tracks at least partially overlap each other, the CPU 184 determines that the comparison result meets the second condition. The sector ranges are each indicated by the sector number and the number of blocks in the write address information.

If the comparison result meets the first condition, the CPU 184 determines that a first write access pattern strongly influenced by ATI has been detected. In this case, the CPU 184 executes first table updating processing (block 804), and then proceeds to block 806. Further, if the comparison result meets the second condition, the CPU 184 determines that a second write access pattern strongly influenced by ATI has been detected. In this case, the CPU 184 executes second table updating processing (block 805), and then proceeds to block 806.

In contrast, if the comparison result meets neither of the first and second conditions, the CPU 184 determines that any write access pattern (the first or second write access pattern) strongly influenced by ATI has not been detected. In this case, the CPU 184 skips over block 804 or 805 to block 806.

A description will now be given, assuming that it is determined that the comparison result meets neither of the first and second conditions, and the CPU 184 proceeds to block 806. In this case, in block 806, the CPU 184 determines whether the WCL table 220 contains a WCL that has not yet been extracted in block 801. If there is a WCL that has not yet been extracted (Yes in block 806), the CPU 184 returns to block 801 and extracts this WCL as the second WCL from the WCL table 220. The processing performed after this block is similar to the above-mentioned one.

In the embodiment, the tracks (third tracks) indicated by all WCLs (second WCLs) excluding the first WCL and the second sector range do not meet the first or second condition with respect to the second track indicated by the first WCL and the first sector range. It is assumed that any WCL satisfying the first or second condition does not exist in the WCL table 220. In this case, the write address confirming processing (block 707) is finished without executing either the first table updating processing (block 804) or the second table updating processing (block 805).

Returning to FIG. 7, the CPU 184 determines a rewrite condition based on the rewrite threshold information 251 (block 708). More specifically, if the write address confirming processing is finished without executing the first or second table updating processing, the CPU 184 determines a rewrite condition (first rewrite condition) based on the WCB rewrite threshold in the rewrite threshold information 251. Namely, the CPU 184 determines, as the first rewrite condition, a condition that at least one of the values of the first and second WT_CTRs updated in block 705 exceeds the WCB rewrite threshold.

Thereafter, the CPU 184 determines whether the first rewrite condition is satisfied, based on the values of the updated first and second WT_CTRs and the WCB rewrite threshold (block 709). If at least one of the values of the updated first and second WT_CTRs exceeds the WCB rewrite threshold, the CPU 184 determines that the first rewrite condition is satisfied (Yes in block 709). In this description, it is assumed that only the value of the first WT_CTR exceeds the WCB rewrite threshold. In this case, the CPU 184 rewrites data in the track (fifth track) indicated by the combination of the cylinder number and the head number associated with the first WT_CTR (third counter) in the WC table 240, to the same track using the head 12 (block 710).

Subsequently, the CPU 184 initializes, to 0, (i.e., clears) the first WT_CTR (which is stored in the WC table 240 and associated with the rewritten track) (block 711). Further, the CPU 184 initializes, to 0, −CTR and +CTR stored in the BSWM table 230 and associated with the rewritten track (block 712), thereby finishing the write processing.

Also when the value of the second WT_CTR exceeds the WCB rewrite threshold, rewrite processing similar to that performed when the value of the first WT_CTR exceeds the WCB rewrite threshold is performed. In accordance with the rewrite processing, the second WT_CTR, and the −CTR and +CTR associated with the rewritten track, are initialized.

The write processing performed in the second case (where the write access pattern strongly influenced by ATI is detected) will be described. First, it is assumed that blocks 701 to 706 in the flowchart of FIG. 7 have already been executed as in the above-described first case. During this time, the write address confirming processing (block 707) is executed in accordance with the flowchart of FIG. 8. Namely, processing in blocks 801 to 803 is iteratively executed for all WCLs in the WCL table 220.

It is assumed here that the second WCL is extracted from the WCL table 220 (block 801), and that write address information (second write address information) in the second WCL is compared with write address information (first write address information) in the first WCL (block 802). During this time, as in the first case, the CPU 184 determines, based on a comparison result, whether the second write position (the position of the third track) indicated by the second WCL satisfies the first or second condition with respect to the current first write position (the position of the second track) indicated by the first WCL (block 803).

A description will be given of an operation performed when the comparison result (i.e., the comparison result in block 802) satisfies the first condition. In this case, the CPU 184 performs first table updating processing (block 804) in accordance with the flowchart of FIG. 9. First, the CPU 184 refers to the −1 flag in the second WCL (block 901), thereby determining whether the −1 flag is set (block 902).

If the −1 flag in the second WCL is not set (No in block 902), the CPU 184 determines that a data write to the third track indicated by the second WCL is not yet reflected in the +CTR in the entry of the BSWM table 230 associated with the outer adjacent track (i.e., the −1 side track) of the third track. Since in this case, the comparison result meets the first condition, the third track exists on the +2 side of the second track indicated by the first WCL. Accordingly, the CPU 184 determines that the track (i.e., the track on the +1 side of the second track) between the second track and the +2 side track (third track) is strongly influenced by ATI.

In this case, the CPU 184 updates the +CTR in the entry of the BSWM table 230 associated with the +1 side track of the second track, i.e., the −1 side track (fourth track) of the third track (block 903). In the embodiment, the additional value used for this update is calculated in accordance with the equation (1) used for updating the WT_CTR. Alternatively, the value identical to the write count (WC), i.e., the number of actual writes, may be used as the additional value.

Further, the CPU 184 sets the −1 flag in the second WCL (i.e., the second WCL stored in the WCL table 220) (block 904). Thus, the −1 flag in the second WCL is indicative of that the data write previously executed to the third track has been reflected in the +CTR in the entry of the BSWM table 230 associated with the −1 side track (fourth track) of the third track. After executing blocks 903 and 904, the CPU 184 proceeds to block 905.

In contrast, if the −1 flag in the second WCL is set (Yes in block 902), the CPU 184 determines that a data write to the third track indicated by the second WCL is already reflected in the +CTR in the entry of the BSWM table 230 associated with the −1 side track (fourth track) of the third track. In this case, the CPU 184 skips over blocks 903 and 904 to block 905. As a result, the data write to the third track indicated by the second WCL is prevented from being redundantly reflected in the +CTR in the entry of the BSWM table 230 associated with the −1 side track of the third track.

In block 905, the CPU 184 refers to the +1 flag in the first WCL, thereby determining whether the +1 flag in the first WCL is set (block 906).

If the +1 flag in the first WCL is not set (No in block 906), the CPU 184 determines that the current data write (namely, the data write to the second track indicated by the first WCL) is not yet reflected in the −CTR in the entry of the BSWM table 230 associated with the adjacent track (i.e., the +1 side track) on the +side (inner side) of the second track. In this case, the CPU 184 proceeds to block 907.

In block 907, the CPU 184 updates the −CTR in the entry of the BSWM table 230 associated with the track (fourth track) on the +1 side of the second track (i.e., on the −1 side of the third track), like the above-mentioned update of the +CTR in block 903. Further, the CPU 184 sets the +1 flag in the first WCL (i.e., the first WCL stored in the WCL table 220) (block 908). Thus, the +1 flag in the first WCL is indicative of that the data write currently executed to the second track has been reflected in the −CTR in the entry of the BSWM table 230 associated with the +1 side track of the second track. After executing blocks 907 and 908, the CPU 184 finishes the first table update processing (block 804).

In contrast, if the +1 flag in the first WCL is set (Yes in block 906), the CPU 184 determines that the data write to the second track indicated by the first WCL (the current data write) is already reflected in the −CTR in the entry of the BSWM table 230 associated with the +1 side track (fourth track) of the second track. In this case, the CPU 184 skips over blocks 907 and 908, thereby finishing the first table update processing (block 804). By skipping over blocks 907 and 908, the data write to the second track indicated by the first WCL is prevented from being redundantly reflected in the −CTR in the entry of the BSWM table 230 associated with the +1 side track of the second track.

A description will now be given of the operation performed when the comparison result in block 802 meets the second condition. In this case, the CPU 184 executes second table update processing (block 805) as described below, in accordance with the flowchart shown in FIG. 10. The second table update processing is similar to the first table update processing (block 804). Therefore, the second table update processing will not described in detail. If necessary, in the first table update processing, "+" should be replaced with "−," and vice versa.

Firstly, the CPU 184 refers to the +1 flag in the second WCL (block 1001), thereby determining whether this −1 flag is set (block 1002). If the −1 flag in the second WCL is not set (No in block 1002), the CPU 184 proceeds to block 1003.

In block 1003, the CPU 184 updates the −CTR in the entry of the BSWM table 230 associated with the −1 side track of the second track indicated by the first WCL, i.e., the +1 side track (fourth track) of the third track indicated by the second WCL. Further, the CPU 184 sets the +1 flag in the second WCL (block 1004). Thus, the +1 flag in the second WCL is indicative of that the data write previously executed to the third track has been reflected in the −CTR in the entry of the BSWM table 230 associated with the +1 side track of the third track.

After executing blocks 1003 and 1004, the CPU 184 proceeds to block 1005. In contrast, if the +1 flag in the second WCL is set (Yes in block 1002), the CPU 184 skips over blocks 1003 and 1004 to block 1005. In block 1005, the CPU 184 refers to the −1 flag in the first WCL, thereby determining whether the −1 flag in the first WCL is set (block 1006).

If the −1 flag in the first WCL is not set (No in block 1006), the CPU 184 proceeds to block 1007. In block 1007, the CPU 184 updates the +CTR in the entry of the BSWM table 230 associated with the track (fourth track) on the −1 side of the second track, i.e., on the +1 side of the third track. Further, the CPU 184 sets the −1 flag in the first WCL (block 1008). After executing blocks 1007 and 1008, the CPU 184 finishes the second table update processing (block 805).

In contrast, if the +1 flag in the first WCL is set (Yes in block 1006), the CPU 184 skips blocks 1007 and 1008, thereby finishing the second table update processing (block 805).

After finishing the first table update processing (block 804) or the second table update processing (block 805), the CPU 184 proceeds to block 806. In block 806, the CPU 184 determines whether the WCL table 220 contains a WCL that has not yet been extracted in block 801. If there is a WCL that has not yet been extracted (Yes in block 806), the CPU 184 returns to block 801, where it extracts this WCL as the second WCL from the WCL table 220. The processing performed after this block is similar to the above-mentioned one.

It is assumed here that all WCLs except for the first WCL (the second WCLs) were extracted from the WCL table 220 before long, and hence no non-extracted WCLs are left therein (No in block 806). In this case, the CPU 184 finishes the write address confirming processing (block 707).

Then, the CPU 184 determines a rewrite condition based on the rewrite threshold information 251 (block 708). More specifically, if the write address confirming processing has been finished after the first or second table update processing is executed at least once as described above, the CPU 184 determines rewrite conditions (first to third rewrite conditions) as described below, based on the WCB rewrite threshold and the BSWMB rewrite threshold in the rewrite threshold information 251.

Firstly, the CPU 184 determines as the first rewrite condition that at least one of the values of the first and second WT_CTRs updated in block 705 exceeds the WCB rewrite threshold. Further, if the +CTR (hereinafter referred to as "the first +CTR) or −CTR (hereinafter referred to as "the first −CTR) in the entry of the BSWM table 230 associated with the track (fourth track) on the +1 side of the second track (i.e., on the −1 side of the third track) has been updated in block 903 or 907, the CPU 184 determines as the second rewrite condition that the first +CTR and the first −CTR each have a value not less than a first value, and the sum of the values of the first +CTR and the first −CTR exceeds the BSWMB rewrite threshold. Further, if the −CTR (hereinafter referred to as "the second −CTR) or +CTR (hereinafter referred to as "the second +CTR) in the entry of the BSWM table 230 associated with the track (fourth track) on the −1 side of the second track has been updated in block 1003 or 1007, the CPU 184 determines as the third rewrite condition that each of the values of the second −CTR and the second +CTR is not less than the first value, and the sum of the values of the second −CTR and the second +CTR exceeds the BSWMB rewrite threshold. In the embodiment, the first value is 1. However, the first value may be greater than 1.

Subsequently, the CPU 184 determines whether the first rewrite condition is satisfied, based on the values of the updated first and second WT_CTRs and the WCB rewrite threshold (block 709). Also in block 709, the CPU 184 determines whether the second rewrite condition is satisfied, based on values of the first +CTR and the first −CTR and the BSWMB rewrite threshold. Further in block 709, the CPU 184 determines whether the third rewrite condition is satisfied, based on values of the second +CTR and the second −CTR and the BSWMB rewrite threshold. Assume here that only the second rewrite condition is satisfied (Yes in block 709). In this case, the CPU 184 rewrites data in the track (fourth track=first track) indicated by the combination of the cylinder number and the head number associated in the BSWM table 230 with the combination of the first +CTR and the first −CTR, to the same track using the head 12 (block 710).

After that, the CPU 184 initializes, to 0, the WT_CTR stored in the WC table 240 and associated with the rewritten track (block 711). The CPU 184 also initializes, to 0, the first +CTR and the first −CTR (i.e., the +CTR and the −CTR stored in the BSWM table 230 and associated with the rewritten track) (block 712), thereby finishing the write processing.

Also when the third rewrite condition is satisfied, the same rewrite as when the second rewrite condition is satisfied is performed. Namely, the CPU 184 rewrites data in the track indicated by the combination of the cylinder number and the head number associated in the BSWM table 230 with the combination of the second +CTR and the second −CTR, to the same track using the head 12 (block 710).

Thereafter, the CPU 184 further initializes, to 0, the WT_CTR stored in the WC table 240 and associated with the rewritten track (block 711). The CPU 184 also initializes, to 0, the second +CTR and the second −CTR (i.e., the +CTR and the −CTR stored in the BSWM table 230 and associated with the rewritten track) (block 712).

In the embodiment, when a data write to the track (second track) designated by a write command from the host has been executed (block 703), the CPU 184 executes write address confirming processing (block 707). As a result, the CPU 184 detects a first or second write access pattern strongly influenced by ATI (blocks 801 to 803). More specifically, the CPU 184 detects the third track (i.e., the track to which data was previously written) on the −2 or +2 side of the second track, based on the second WCLs stored in the WCL table 220.

In accordance with the detection of the first or second write access pattern (namely, the detection of the third track satisfying the first or second condition), the CPU 184 executes the first table update processing (block 804) or the second table update processing (block 805). Thus, the CPU 184 updates the +CTR and the −CTR in the entry of the BSWM table 230 associated with the track (fourth track) between the second track and the third track (i.e., the third track satisfying the first or second condition) (blocks 903 and 907, or 1003 and 1004). In this case, the track (fourth track) associated with the updated +CTR and −CTR is strongly influenced by ATI. Namely, the values of the updated +CTR and −CTR reflect the pattern (first write access pattern) of data writes to the second and third tracks, and sufficiently correspond to the degree of influence of ATI on the fourth track.

In view of this, the CPU 184 determines whether a data rewrite to the track associated with the updated +CTR and −CTR is necessary, based on the BSWMB rewrite threshold lower than the WCB rewrite threshold. More specifically, the CPU 184 performs a data rewrite to the track associated with the updated +CTR and −CTR, if the +CTR and −CTR are each not less than 1 (the first value), and the sum of the +CTR and −CTR exceeds the BSWMB rewrite threshold (Yes in block 709), the data rewrite to the track associated with the +CTR and −CTR is performed (block 710).

As described above, in the embodiment, the CPU 184 rewrites data in the track (i.e., the track between the second and third tracks) strongly influenced by ATI when data is written to the second and third tracks, to the same track (fourth track=first track) at appropriate timing, based on the BSWMB rewrite threshold lower than the WCB rewrite threshold. Moreover, in a situation (corresponding to the second write access pattern) in which a data write to the third track is not performed although a data write to the second track is repeated, rewriting of the data stored in the fourth track (fifth track) is performed at relatively long activation intervals, based on the WCB rewrite threshold. Accordingly, in the embodiment, data in each track on the disk 11 is reliably prevented from being lost, and access performance of the magnetic disk drive can be prevented from being degraded.

In the above-described at least one embodiment, data stored in a track between at least two tracks can be rewritten at appropriate timing, based on the degree of influence of data writes to the at least two tracks on the track between the at least two tracks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
   a disk comprising a plurality of tracks including a first track;
   a head configured to write data to the disk and to read data from the disk; and
   a controller configured to control a data write to the disk by the head, and a data read from the disk by the head,
   wherein the controller is further configured to:
   manage influence, on the plurality of tracks, of data writes to tracks within outer adjacent track ranges and to tracks within inner adjacent track ranges, using, respectively, first counters and second counters associated with the plurality of tracks, wherein
   the outer adjacent track ranges are adjacent to the plurality of tracks outside the plurality of tracks, respectively,
   the inner adjacent track ranges are adjacent to the plurality of tracks inside the plurality of tracks, respectively,
   the first counters are indicative of numbers of data writes to tracks within the outer adjacent track ranges, respectively, and
   the second counters are indicative of numbers of data writes to tracks within the inner adjacent track ranges, respectively;
   manage influence, on the plurality of tracks, of data writes to tracks within adjacent track ranges adjacent to the plurality of tracks on both sides of the plurality of tracks, using, respectively, a third counters associated with the plurality of tracks, the third counters being indicative of values corresponding to numbers of data writes to tracks within the adjacent track ranges adjacent to the plurality of tracks, respectively;
   rewrite data in the first track to the first track when both a value of a first counter associated with the first track and a value of a second counter associated with the first track are not less than a first value, and a sum of the values of the first counter and the second counter associated with the first track exceeds a first rewrite threshold, the first counter and the second counter associated with the first track being included in the first counters and the second counters, respectively; and
   rewrite data in a track associated with a third counter to the track associated with the third counter when a value of the third counter exceeds a second rewrite threshold greater than the first rewrite threshold, the third counter being included in the third counters.

2. The magnetic disk drive of claim 1, further comprising a memory,
   wherein the controller is further configured to:
   store log information in the memory in accordance with writing of data to the disk, the log information including address information indicative of a position of a track to which the data is written; and
   update, when first log information including address information indicative of a position of a second track is stored in the memory in accordance with a data write to the second track, a first counter associated with a fourth track between the second track and a third track or a second counter associated with the fourth track, based on whether second log information including address information indicative of the third track is stored in the memory, the first counter and the second counter being included in the first counters and the second counters, respectively, the third track being located at least two tracks from the second track toward the outside or the inside of the disk.

3. The magnetic disk drive of claim 2, wherein:
the log information includes a first flag and a second flag, the first flag being indicative of whether one of the first counters, associated with a track within an outer adjacent track range adjacent to track indicated by the address information in the log information, is updated in accordance with a data write to the indicated track, the second flag being indicative of whether one of the second counters, associated with a track within an inner adjacent track range adjacent to the indicated track, is updated in accordance with the data write to the indicated track, the first and second flags being indicative of, in a first state, that the one of the first counters and the one of the second counters are updated, respectively, and being indicative of, in a second state, that the one of the first counters and the one of the second counters are not yet updated, respectively; and
the controller is further configured to update the first or second counter associated with the fourth track, and to change a first or second flag in the second log information to the first state, when the second log information is stored in the memory, and the first or second flag in the second log information is in the second state.

4. The magnetic disk drive of claim 3, wherein the controller is further configured to update the first or second counter associated with the fourth track, and to change a first or second flag in the first log information to the first state, when the second log information is stored in the memory, and the first or second flag in the first log information is in the second state.

5. The magnetic disk drive of claim 2, wherein the controller is further configured to:
calculate an additional value used to update the first or second counter associated with the fourth track by weighing number of data writes to the second track using at least one of a first coefficient, a second coefficient and a third coefficient, the first coefficient corresponding to an ambient temperature of the magnetic disk drive during a data write to the second track, the second coefficient corresponding to a radial position of the second track on the disk, and the third coefficient corresponding to number of retries during the data write to the second track; and
add the calculated additional value to a value of the first or second counter associated with the fourth track.

6. The magnetic disk drive of claim 2, wherein the controller is further configured to:
select one of a first slice value and a second slice value lower than the first slice value, based on whether log information including address information indicative of a position of a track within an outer adjacent track range or an inner adjacent track range adjacent to the second track is stored in the memory, each of the first and second slice values corresponding to a displacement of the head allowable when the head is positioned, for writing data, on a track to which the data is to be written; and
cause the head to write the data to the second track when the displacement of the head falls within a range within which the selected slice value is allowed to fall.

7. A method, for use in a magnetic disk drive, of controlling a data rewrite, the method comprising:
managing influence, on plurality of tracks on a disk, of data writes to tracks within an outer adjacent track ranges and to tracks within inner adjacent track ranges, using, respectively, first counters and second counters associated with the plurality of tracks, the plurality of tracks including a first track, the outer adjacent track ranges being adjacent to the plurality of tracks outside the plurality of tracks, respectively, the inner adjacent track ranges being adjacent to the plurality of tracks inside the plurality of tracks, respectively, the first counters being indicative of numbers of data writes to tracks within the outer adjacent track ranges, respectively, the second counters being indicative of numbers of data writes to tracks within the inner adjacent track ranges, respectively; and
managing influence, on the plurality of tracks, of data writes to tracks within adjacent track ranges adjacent to the plurality of tracks on both sides of the plurality of tracks, using, respectively, third counters associated with the plurality of tracks, the third counters being indicative of a values corresponding to numbers of data writes to tracks within the adjacent track ranges adjacent to the plurality of tracks, respectively;
rewriting data in the first track to the first track when both a value of a first counter associated with the first track and a value of a second counter associated with the first track are not less than a first value, and a sum of the values of the first counter and the second counter associated with the first track exceeds a first rewrite threshold, the first counter and the second counter associated with the first track being included in the first counters and the second counters, respectively; and
rewriting data in a track associated with a third counter to the track associated with the third counter when a value of the third counter exceeds a second rewrite threshold greater than the first rewrite threshold, the third counter being included in the third counters.

8. The method of claim 7, further comprising:
storing log information in a memory in accordance with writing of data to the disk, the log information including address information indicative of a position of a track to which the first data is written;
determining, when first log information including address information indicative of a position of a second track is stored in the memory in accordance with a data write to the second track, whether second log information including address information indicative of a third track is stored in the memory, the third track being located at least two tracks from the second track toward the outside or the inside of the disk; and
updating a first counter associated with a fourth track between the second track and the third track or a second counter associated with the fourth track, when the second log information is stored in the memory, the first counter and the second counter being included in the first counters and the second counters, respectively.

9. The method of claim 8, wherein:
the log information includes a first flag and a second flag, the first flag being indicative of whether one of the first counters, associated with a track within an outer adjacent track range adjacent to a track indicated by the address information in the log information, is updated in accordance with a data write to the indicated track, the second flag being indicative of whether one of the second counters, associated with a track within an inner adjacent track range adjacent to the indicated track, is updated in accordance with the data write to the indicated track, the first and second flags being indicative of, in a first state, that the one of the first counters and the one of the second counters are updated, respectively, and being indicative of, in a second state, that the one of the first counters and the one of the second counters are not yet updated, respectively; and the method further comprises updating the first or second counter associated with the fourth track, and changing a first or second flag in the second log information to the first state, when the second log information is stored in the memory, and the first or second flag in the second log information is in the second state.

10. The method of claim 9, further comprising updating the first or second counter associated with the fourth track, and changing a first or second flag in the first log information to the first state, when the second log information is stored in the memory, and the first or second flag in the first log information is in the second state.

11. The method of claim 8, further comprising:
calculating an additional value used to update the first or second counter associated with the fourth track by weighing number of data writes to the second track using at least one of a first coefficient, a second coefficient and a third coefficient, the first coefficient corresponding to an ambient temperature of the magnetic disk drive during a data write to the second track, the second coefficient corresponding to a radial position of the second track on the disk, and the third coefficient corresponding to number of retries during the data write to the second track; and
adding the calculated additional value to a value of the first or second counter associated with the fourth track.

12. The method of claim 8, further comprising:
selecting one of a first slice value and a second slice value lower than the first slice value, based on whether log information including address information indicative of a position of a track within an outer adjacent track range or an inner adjacent track range adjacent to the second track is stored in the memory, each of the first and second slice values corresponding to a displacement of the head allowable when the head is positioned, for writing data, on a track to which the data is to be written; and
causing the head to write the data to the second track when the displacement of the head falls within a range within which the selected slice value is allowed to fall.

* * * * *